(12) United States Patent
Sun et al.

(10) Patent No.: US 10,922,795 B2
(45) Date of Patent: Feb. 16, 2021

(54) METHOD AND DEVICE FOR MEASURING DISTORTION PARAMETER OF VISUAL REALITY DEVICE, AND MEASURING SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yukun Sun, Beijing (CN); Hao Zhang, Beijing (CN); Lili Chen, Beijing (CN); Jinghua Miao, Beijing (CN); Bin Zhao, Beijing (CN); Xuefeng Wang, Beijing (CN); Wenyu Li, Beijing (CN); Xi Li, Beijing (CN); Lixin Wang, Beijing (CN); Jianwen Suo, Beijing (CN); Yali Liu, Beijing (CN); Yakun Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 19 days.

(21) Appl. No.: 16/479,103

(22) PCT Filed: Nov. 27, 2018

(86) PCT No.: PCT/CN2018/117654
§ 371 (c)(1),
(2) Date: Jul. 18, 2019

(87) PCT Pub. No.: WO2019/184410
PCT Pub. Date: Oct. 3, 2019

(65) Prior Publication Data
US 2020/0380644 A1  Dec. 3, 2020

(30) Foreign Application Priority Data

Mar. 27, 2018 (CN) .......................... 201810259343.8

(51) Int. Cl.
G06T 5/00 (2006.01)
G06T 5/50 (2006.01)
G06T 7/73 (2017.01)

(52) U.S. Cl.
CPC ................ G06T 5/006 (2013.01); G06T 5/50 (2013.01); G06T 7/75 (2017.01)

(58) Field of Classification Search
CPC .............. G06T 5/006; G06T 7/75; G06T 5/50
See application file for complete search history.

(56) References Cited

U.S. PATENT DOCUMENTS

| 6,538,691 | B1* | 3/2003 | Macy ................... H04N 3/2335 348/222.1 |
| 2011/0081098 | A1* | 4/2011 | Cho ........................ G06T 5/006 382/275 |
| 2017/0206689 | A1* | 7/2017 | Eo .......................... H04N 9/646 |

FOREIGN PATENT DOCUMENTS

| CN | 101271573 A | 9/2008 |
| CN | 101572828 A | 11/2009 |

(Continued)

OTHER PUBLICATIONS

Jones, "Correction of Geometric Distortions and the Impact of Eye Position in Virtual Reality Displays", IEEE, 2015 (Year: 2015).*

(Continued)

*Primary Examiner* — Maurice L. McDowell, Jr.
(74) *Attorney, Agent, or Firm* — Westman, Champlin & Koehler, P.A.

(57) ABSTRACT

A method measuring a distortion parameter of a visual reality device includes: obtaining an anti-distortion grid image according to a first distortion coefficient; obtaining a (Continued)

grid image of the anti-distortion grid image at a preset viewpoint after the anti-distortion grid image passes through a to-be-measured optical component of the visual reality device; determining a distortion type of the grid image after passing through the to-be-measured optical component; adjusting the first distortion coefficient according to the distortion type of the grid image, thereby obtaining an adjusted first distortion coefficient and then reducing distortion of the grid image; repeating the above steps until the distortion of the grid image is less than or equal to a distortion threshold. The adjusted first distortion coefficient when the distortion of the grid image is less than or equal to the distortion threshold, is taken as a distortion coefficient of the to-be-measured optical component.

15 Claims, 6 Drawing Sheets

(56) References Cited

FOREIGN PATENT DOCUMENTS

| | | |
|---|---|---|
| CN | 103792674 A | 5/2014 |
| CN | 105869142 A | 8/2016 |
| CN | 106204480 A | 12/2016 |
| CN | 107329263 A | 11/2017 |
| CN | 108510549 A | 9/2018 |
| JP | 2004-151675 A | 5/2004 |

OTHER PUBLICATIONS

Second Office Action, including Search Report, for Chinese Patent Application No. 201810259343.8, dated Aug. 18, 2020, 25 pages.

* cited by examiner

METHOD AND DEVICE FOR MEASURING DISTORTION PARAMETER OF VISUAL REALITY DEVICE, AND MEASURING SYSTEM

CROSS-REFERENCE TO RELATED APPLICATION

The present application is the U.S. national phase of PCT Application No. PCT/CN2018/117654, filed on Nov. 27, 2018, which has not yet published, and claims a priority to Chinese Patent Application No. 201810259343.8 filed on Mar. 27, 2018, the disclosures of which are incorporated in their entireties by reference herein.

TECHNICAL FIELD

The present disclosure relates to the field of display technologies, and in particular to a method and device for measuring distortion parameter of visual reality device and a measuring system.

BACKGROUND

A virtual reality (VR) device, such as VR glasses, can form a virtual reality visual effect. The VR device is provided with optical components such as a lens, and displayed images of a display device can be magnified to a distance according to the principle that the lens produces an upright magnified virtual image of an object within a focal point of the lens. Thus, what the human eye sees is a visual effect similar to that of a large screen image. However, due to characteristics of the lens itself, distortion of images is inevitably generated, which affects user experience.

SUMMARY

According to a first aspect, one embodiment of the present disclosure provides a method and device for measuring a distortion parameter of a visual reality device. The method includes: obtaining an anti-distortion grid image according to a first distortion coefficient; obtaining a grid image of the anti-distortion grid image at a preset viewpoint after the anti-distortion grid image passes through a to-be-measured optical component of the visual reality device; determining a distortion type of the grid image after passing through the to-be-measured optical component; adjusting the first distortion coefficient according to the distortion type of the grid image, thereby obtaining an adjusted first distortion coefficient and then reducing distortion of the grid image; repeating the above steps until the distortion of the grid image is less than or equal to a distortion threshold. The adjusted first distortion coefficient when the distortion of the grid image is less than or equal to the distortion threshold, is taken as a distortion coefficient of the to-be-measured optical component.

Optionally, the obtaining an anti-distortion grid image according to a first distortion coefficient includes: obtaining a central position of a center of the to-be-measured optical component in a first grid image; using a distortion model with the first distortion coefficient to calculate a corresponding position of each grid point after the anti-distortion in the first grid image which takes the central position as a center, thereby obtaining the anti-distortion grid image.

Optionally, the obtaining a grid image of the anti-distortion grid image at a preset viewpoint after the anti-distortion grid image passes through a to-be-measured optical component of the visual reality device includes: obtaining an acquired grid image of the anti-distortion grid image via an image acquisition device at the preset viewpoint after the anti-distortion grid image passes through the to-be-measured optical component.

Optionally, the determining a distortion type of the grid image after passing through the to-be-measured optical component includes: obtaining via an image processing algorithm a bending direction of grid lines in the grid image after passing through the to-be-measured optical component relative to the center of the grid image after passing through the to-be-measured optical component; determining the distortion type of the grid image according to the bending direction.

Optionally, the determining the distortion type of the grid image according to the bending direction includes: determining the distortion type of the grid image to be pillow distortion when the grid lines in the grid image bend in a direction towards the center of the grid image; determining the distortion type of the grid image to be barrel distortion when the grid lines in the grid image bend in the direction far from the center of the grid image.

Optionally, the obtaining via an image processing algorithm a bending direction of grid lines in the grid image after passing through the to-be-measured optical component relative to the center of the grid image after passing through the to-be-measured optical component, includes: using the image processing algorithm to obtain a slope of a line segment defined by a point at an edge position and a point adjacent the center of the grid image among grid lines in the grid image after passing through the to-be-measured optical component, and determining the bending direction according to the slope.

Optionally, the adjusting the first distortion coefficient according to the distortion type of the grid image includes: reducing the first distortion coefficient when the distortion type of the grid image is barrel distortion, and increasing the preset distortion coefficient when the distortion type of the grid image is pillow distortion.

Optionally, before obtaining an acquired grid image of the anti-distortion grid image via an image acquisition device at the preset viewpoint after the anti-distortion grid image passes through the to-be-measured optical component, the method further includes: obtaining a distortion coefficient of the image acquisition device.

Optionally, before obtaining an acquired grid image of the anti-distortion grid image via an image acquisition device at the preset viewpoint after the anti-distortion grid image passes through the to-be-measured optical component, the method further includes: adjusting the image acquisition device, thereby enabling an imaging plane of the image acquisition device to be parallel with a plane where the preset grid image is located.

According to a second aspect, one embodiment of the present disclosure provides a distortion parameter measuring device for a visual reality device including: an anti-distortion grid image obtaining circuit configured to obtain an anti-distortion grid image according to a first distortion coefficient; a grid image obtaining circuit configured to obtain a grid image of the anti-distortion grid image at a preset viewpoint after the anti-distortion grid image passes through a to-be-measured optical component; a distortion type determining circuit configured to determine a distortion type of the grid image after passing through the to-be-measured optical component; and a distortion coefficient adjustment circuit configured to adjust the first distortion coefficient according to the distortion type of the grid image, thereby reducing distortion of the grid image. The adjusted first distortion coefficient when the distortion of the grid image is less than or equal to a distortion threshold, is taken as a distortion coefficient of the to-be-measured optical component.

According to a third aspect, one embodiment of the present disclosure provides a distortion parameter measuring system for a visual reality device including: a measuring bracket; a visual reality device disposed on the measuring bracket and including a to-be-measured optical component; an image acquisition device disposed on the measuring bracket and located at a light emitting side of the optical component; and a controller coupled with the visual reality device and the image acquisition device, respectively. The controller includes the above measuring device.

Optionally, the measuring bracket includes a horizontal rod and a vertical rod; the virtual reality device is disposed on the horizontal rod; the image acquisition device is disposed on the vertical rod, and is at the light emitting side of the optical component.

Optionally, the measuring system further includes two fixing plates; the two fixing plates are fixed to the measuring bracket, respectively; and the two fixing plates clamp the virtual reality device.

Optionally, the measuring system further includes a sliding rail with scales; the controller controls the image acquisition device to move along the sliding rail, thereby enabling the image acquisition device to be at the preset viewpoint.

Optionally, the measuring system further includes a distance detector configured to may detect a distance between the image acquisition device and the virtual reality device, and then send the detected distance to the controller, so that the controller controls the image acquisition device to move along the sliding rail, thereby enabling the image acquisition device to be at the preset viewpoint.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Detailed description of the exemplary embodiments will be made herein, with examples thereof to be shown in drawings. In the following descriptions, when the drawings are referred to, unless expressed otherwise, the same number in different drawings refers to the same or similar elements. The embodiments described in the exemplary embodiments as below do not represent all embodiments that are consistent with the present disclosure. On the contrary, they are only examples of the devices and the methods that are consistent with some of the aspects of the present disclosure as recited in the claims.

Since a virtual reality device is provided with an optical component such as a lens, an image observed through the optical component is inevitably distorted. In order to prevent the image observed by the user from being distorted, anti-distortion processing is required for the image. When performing the anti-distortion processing on the image, a distortion model is usually employed. When using the distortion model to perform the anti-distortion processing on the image, the distortion coefficient of the optical component directly affects the anti-distortion processing effect of the image.

Figure 1:
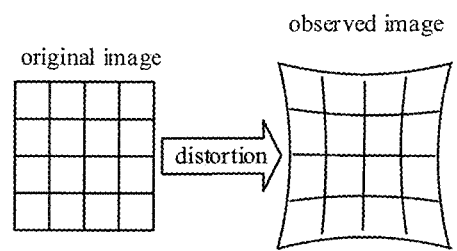
FIG. 1 is a schematic diagram showing distortion of a grid image in the related art.

For example, as shown in FIG. 1, an original image on the left is a normal picture image, and is a grid image includes a plurality of grids. When without any processing, an image observed through the virtual reality device is the image on the right side. The observed image on the right side has a pillow-like distortion, which causes the image observed by the user to be distorted and affects the user experience.

Figure 2:
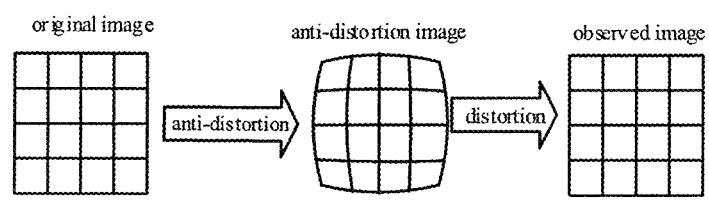
FIG. 2 is a schematic diagram showing anti-distortion of a grid image in the related art.

In view of this, the virtual reality device in the related art usually performs anti-distortion processing on the original image. As shown in FIG. 2, an image obtained after performing anti-distortion processing on the original image is an anti-distortion image.

A distortion direction of the anti-distortion grid image is opposite to a distortion direction of observed image after distortion as shown in FIG. 1. The above anti-distortion processing enables the image observed by the user through the virtual reality device to be an observed image without distortion.

When performing the anti-distortion processing on the image, the distortion model is usually employed to correct the distorted image to reduce the image distortion. The distortion model includes a distortion coefficient corresponding to a lens. One way for obtaining the distortion coefficient may measure the lens in the virtual reality device with reverse optical paths.

Figure 3:
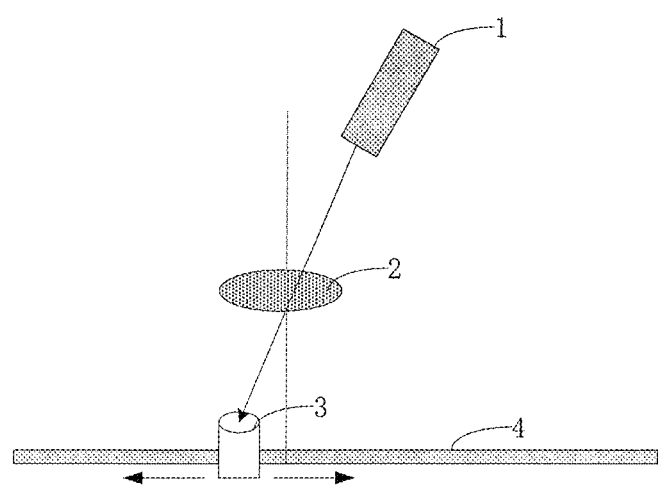
FIG. 3 is a schematic view of a measuring system for measuring a distortion coefficient of a to-be-measured lens in the related art.

As shown in FIG. 3, devices employed in this measuring method include: a collimator 1 and a charge-coupled device (CCD) 3. The measuring method specifically includes: emitting parallel light rays via the collimator 1, converging the parallel light rays by the to-be-measured lens 2, detecting with the CCD 3 a position p1 of a convergence light spot of the converged light rays passing through the to-be-measured lens, and calculating a theoretical position p2 of the convergence light spot under ideal conditions according to the concentrating principle of the lens 2, and comparing the position p1 with the theoretical position p2 to calculate the distortion coefficient corresponding to the to-be-measured lens.

In this measuring method, it is necessary to move the collimator 1 so that the emitted parallel light rays pass through various positions of the to-be-measured lens 2. The position of the CCD 3 can be adjusted along a railway 4 in a direction indicated with an arrow shown in drawings, thereby enabling the CCD 3 to detect the position p1 of the light spot. In this way, the distortion coefficients of various positions of the to-be-measured lens 2 are measured one by one. According to this measuring method, when the number of the measured positions is small or unreasonable, the resulting distortion coefficient is not accurate.

In view of this, one embodiment of the present disclosure provides a method for measuring a distortion parameter of a visual reality device. This measuring method adjusts the distortion coefficient according to distortions of images after passing through an optical component, thereby obtaining a relatively accurate distortion coefficient corresponding to the to-be-measured optical component.

Figure 4:
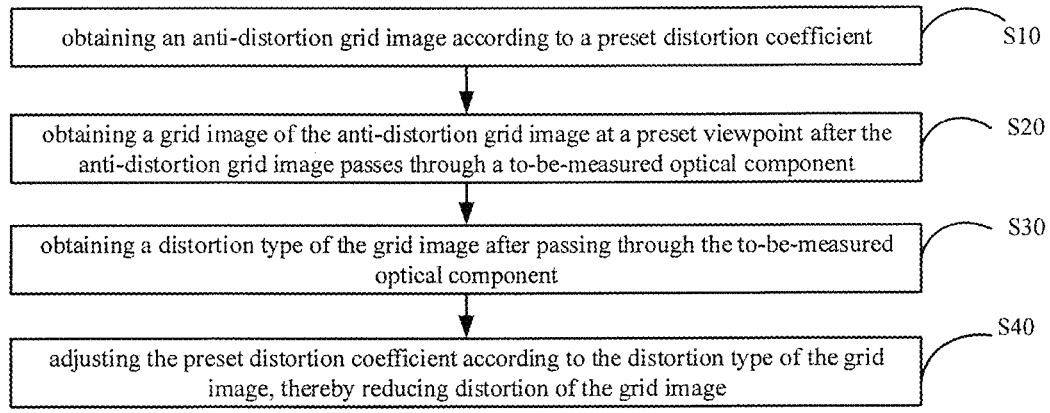
FIG. 4 is a flowchart of a method for measuring a distortion parameter of a visual reality device according to some embodiments of the present disclosure.

The method for measuring the distortion parameter of the visual reality device according to some embodiments of the present disclosure is shown in FIG. 4 and includes the following steps.

A step S10 is to obtain an anti-distortion grid image according to a preset distortion coefficient.

A step S20 is to obtain a grid image of the anti-distortion grid image at a preset viewpoint after the anti-distortion grid image passes through a to-be-measured optical component.

A step S30 is to obtain a distortion type of the grid image after passing through the to-be-measured optical component.

A step S40 is to adjust the preset distortion coefficient according to the distortion type of the grid image, thereby reducing distortion of the grid image.

The visual reality device includes an optical component. The above to-be-measured optical component refers to the optical component of the visual reality device. The optical component may be a lens or a combination of various lenses.

An output image can be observed through the virtual reality device. The virtual reality device may include a display screen or not include a display screen. The output image may be displayed on the display screen. The final image observed by a user is an image after passing the optical component in the virtual reality device. If the output image is not anti-distorted, the image will be distorted. Thus, a distortion model is often used in the virtual reality device for performing anti-distortion processing to the above image, thereby reducing or preventing distortion of the image and then improving the user's observation of the image.

The preset distortion coefficient may also be referred as a first preset distortion coefficient, and may be an initially preset distortion coefficient according to characteristics of the to-be-measured optical component. There may be one or more preset distortion coefficients, depending on the specific distortion model employed.

The anti-distortion grid image refers to an image obtained by using the preset distortion coefficient to perform an anti-distortion calculation based on a hypothetical grid image observed after passing through the optical component.

The hypothetical grid image observed after passing through the optical component may be an image that is formed by dividing a square into several equal-sized grids, or a chessboard-like image formed by dividing a square into several equal-sized grids which are set alternately in black and white.

The preset viewpoint refers to a position of the user's eyes when the user observes the output image through the virtual reality device. Since the anti-distortion grid image is an image obtained only by performing an anti-distortion calculation based on a hypothetical grid image observed after passing through the optical component, after the anti-distortion grid image passes through the to-be-measured optical component, the anti-distortion grid image is distorted in an direction opposite to a distortion direction of the anti-distortion grid image, thereby producing a grid image similar to one grid image which is normally output without distortion.

Since the anti-distortion grid image refers to an image obtained by using the preset distortion coefficient to perform an anti-distortion calculation, when the preset distortion coefficient is equal to or approaches the distortion coefficient of the to-be-measured optical component, there is no distortion or very little distortion in the image that passes through the to-be-measured optical component.

However, when the preset distortion coefficient is not equal to or differs greatly from the corresponding distortion coefficients of the to-be-measured optical component, there may be unsatisfactory distortion in an image obtained after the anti-distortion grid image passes through the to-be-measured optical component. Accordingly, the preset distortion coefficient can be adjusted according to the distortion type, and distortion of the grid image can be obtained again according to the adjusted distortion coefficient. When the distortion is small or there is no distortion, that is, the distortion is less than or equal to a distortion threshold, the distortion coefficient at this point is an appropriate distortion coefficient corresponding to the to-be-measured optical component, thereby obtaining a relatively accurate distortion coefficient. Moreover, according to the measuring method, the distortion coefficient can be obtained at one time by using the image processing way, and it does not need to measure the distortion coefficient of each position of the optical component one by one, so the measuring method is simplified and the measurement accuracy is improved.

When the above distortion coefficient is used as the distortion coefficient of the optical component in the virtual reality device for performing anti-distortion processing on images, there is no distortion or very little distortion in the image observed through the virtual reality device, thereby improving image display effect of the virtual reality device and improving user experience.

Figure 5:
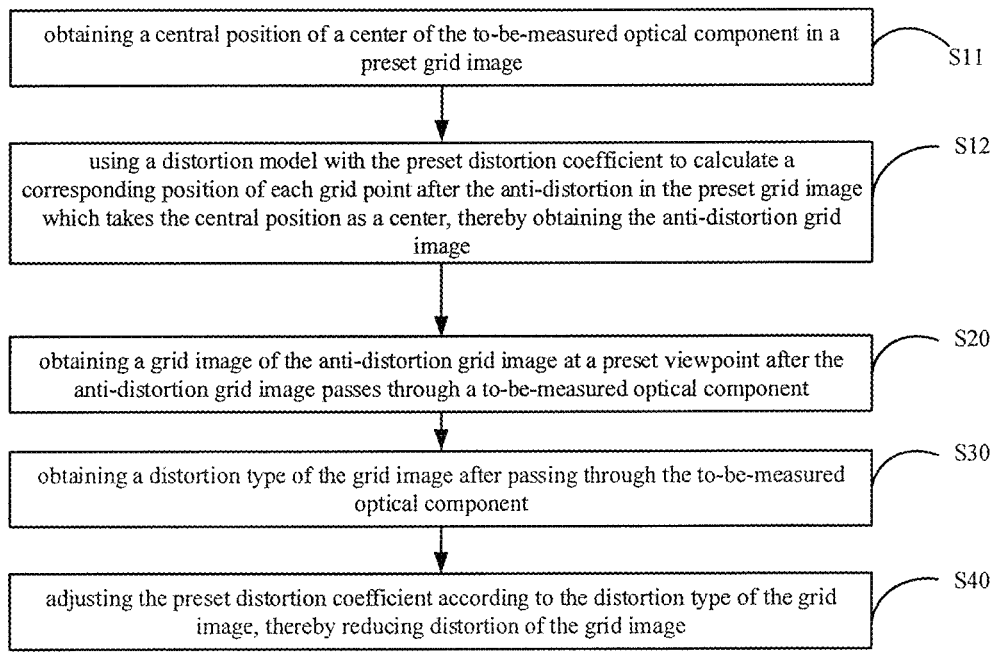
FIG. 5 is a flowchart of a method for measuring a distortion parameter of a visual reality device according to some embodiments of the present disclosure.

In an optional embodiment, as shown in FIG. 5, the above step S10 of obtaining an anti-distortion grid image according to a preset distortion coefficient, includes: a step S11 of obtaining a central position of a center of the to-be-measured optical component in a preset grid image; and a step S12 of using a distortion model with the preset distortion coefficient to calculate a corresponding position of each grid point after the anti-distortion in the preset grid image which takes the central position as a center, thereby obtaining the anti-distortion grid image.

The preset grid image may also be referred as a first grid image, and is a pre-set grid image without distortion. The preset grid image may be displayed through a display screen or a preset grid image printed on a carrier (such as a paper or an imprinting board). The central position of the center of the to-be-measured optical component in the preset grid image can be obtained through a relative position relationship between positions of the to-be-measured optical component and the preset grid image, which is preset or input. An image does not be distorted when the image passes through the center of the optical component and then a corresponding position of each of other grid points in the preset grid image after the anti-distortion can be calculated by taking the central position as a center.

Each grid point refers to a position of each grid after dividing an image into a plurality of grids centered on the central position. A central position of each grid or one of four corners of each grid may be taken as the grid point of each grid. Accordingly, the corresponding position of each grid point after anti-distortion can be calculated through the distortion model with the preset distortion coefficient, thereby obtaining the anti-distortion grid image.

Figure 6A:
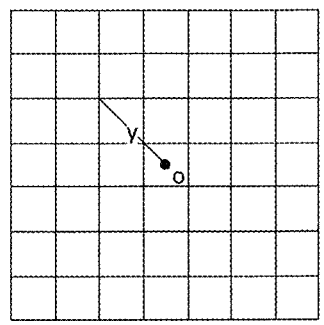
FIG. 6A is a schematic diagram showing a hypothetical grid image ideally observed after passing an optical component according to some embodiments of the present disclosure.
Figure 6B:
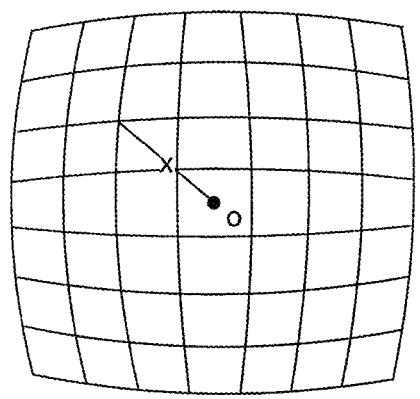
FIG. 6B is a schematic diagram of an anti-distortion grid image which is obtained according to a preset distortion coefficient and which is to be displayed on a display screen according to some embodiments of the present disclosure.

The detailed calculation process is illustrated below in conjunction with FIG. 6A and FIG. 6B. FIG. 6A shows a hypothetical grid image ideally observed after passing an optical component. FIG. 6B shows an anti-distortion grid image which is obtained according to a preset distortion coefficient and which is displayed on a display screen.

The central position is 0 point. The employed distortion model, for example, may be $y=k_1 x^1 + k_2 x^3 + k_3 x^5$, where y represents a length from the central position O point to a grid point (the grid point shown in FIG. 6A is an upper-left corner of the grid) hypothetically ideally observed after passing the optical component, k1, k2 and k3 represent preset distortion coefficients. Then, based on the above distortion model, a length x from the central position O point to each grid point in the preset grid image after anti-distortion can be calculated with the preset distortion coefficient, thereby obtaining the anti-distortion grid image shown in FIG. 6B.

Figure 7:
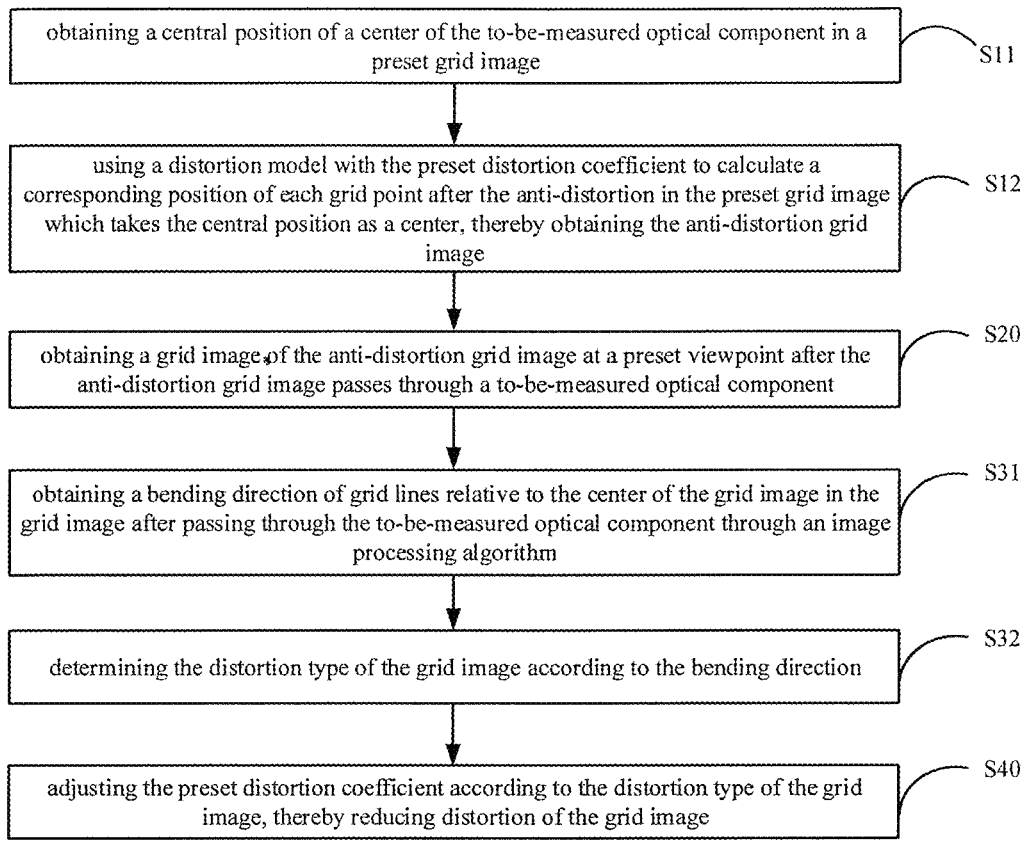
FIG. 7 is a flowchart of a method for measuring a distortion parameter of a visual reality device according to some embodiments of the present disclosure.

In some examples, as shown in FIG. 7, the above step S30 of obtaining a distortion type of the grid image after passing through the to-be-measured optical component, includes: a step S31 of obtaining a bending direction of grid lines relative to the center of the grid image in the grid image after passing through the to-be-measured optical component through an image processing algorithm; and a step S32 of determining the distortion type of the grid image according to the bending direction.

After the anti-distortion grid image passes through the to-be-measured optical component, the anti-distortion grid image is distorted in a direction opposite to a distortion direction of the anti-distortion grid image, thereby producing a grid image similar to one grid image which is normally output without distortion. Then, a bending direction of one or more grid lines relative to the center of the grid image in the grid image can be obtained through the image processing algorithm; and then the distortion type of the grid image can be determined according to the bending direction. Specifically, when the grid lines in the grid image bend in a direction towards the center of the grid image, the distortion type of the grid image is determined to be pillow distortion; when the grid lines in the grid image bend in the direction far from the center of the grid image, the distortion type of the grid image is determined to be barrel distortion.

In some examples, the bending direction may be determined by using the image processing algorithm to obtain a slope of a line segment defined by a point at an edge position and a point adjacent the center of the grid image among grid lines in the grid image after passing through the to-be-measured optical component.

Figure 6C:
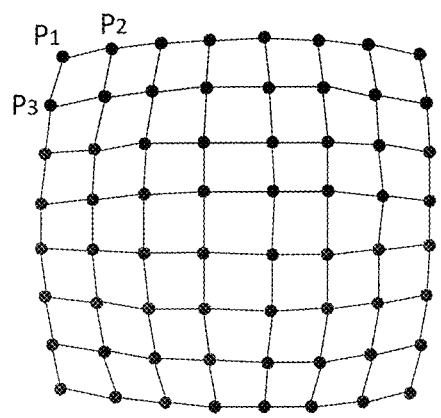
FIG. 6C is a schematic diagram of a grid image after passing through an optical component according to some embodiments of the present disclosure.

After the anti-distortion grid image passes through the to-be-measured optical component, the anti-distortion grid image is distorted in a direction opposite to a distortion direction of the anti-distortion grid image, thereby producing a grid image similar to one grid image which is normally output without distortion. Then, a bending direction can be determined by using the image processing algorithm to obtain a slope of a line segment defined by a point at an edge position and a point adjacent the center of the grid image among grid lines in the grid image. The slope can represent the distortion of the anti-distortion grid after passing through the optical component. Specifically, as shown in FIG. 6C, it is supposed that a grid image obtained after the anti-distortion grid image passes through the optical component is the grid image shown in FIG. 6C, each grid point of the grid image, such as P1 point (which is at an edge position among grid lines), P2 point (which is adjacent the center of the grid image among grid lines in a row direction) and P3 point (which is adjacent the center of the grid image among grid lines in a column direction), may be obtained through a corner detection method or other image processing algorithms. Taking one grid line in the row direction as an example, when a slope of grid line in the grid image after passing through the optical component is greater than 0, for example, a slope of a grid line passing through the points P1 and P2 is greater than 0, it indicates that the grid line bends in the direction far from the center of the grid image and then the distortion type of the grid image can be determined to be barrel distortion as shown in FIG. 6C. Meanwhile, the greater the slope value, the larger the barrel distortion. When the slope of the grid line is less than zero, for example, the slope of the grid line passing through the points P1 and P2 is less than 0, it indicates that the grid line bends in the direction towards the center of the grid image and then the distortion type of the grid image can be determined to be pillow distortion as shown in the right observed image of FIG. 1. The smaller the slope, the larger the pillow distortion. When the slope of the grid line is equal to zero, it indicates that there is no distortion. Thus, the bending direction of the grid line may be determined through its slope and then the distortion type of the grid image can be determined according to the bending direction.

Similarly, when calculating a slope of one grid line in the column direction in the grid image and the slope is greater than 1, it indicates that the distortion type of the grid image can be determined to be barrel distortion as shown in FIG. 6C. At this point, the greater the slope value, the larger the barrel distortion. When the slope of the grid line is less than 1, it indicates that the distortion type of the grid image can be determined to be pillow distortion as shown in the right observed image of FIG. 1. The smaller the slope, the larger the pillow distortion. When the slope of the grid line in the column direction is equal to 1, it indicates that there is no distortion.

In order to more accurately determine the distortion type of the grid image and reduce calculation error, slope of several grid lines can be calculated and then the distortion type can be comprehensively judged by the slope of several grid lines. For example, when the slope of several grid lines indicates that several grid lines bend towards the same direction, it indicates that there is barrel distortion or pillow distortion, which can be used as the basis for subsequent adjustment of the preset distortion coefficient.

In an optional embodiment, the above step S40 of adjusting the preset distortion coefficient according to the distortion type of the grid image, includes: a step S41 of reducing the preset distortion coefficient when the distortion type of the grid image is barrel distortion, and increasing the preset distortion coefficient when the distortion type of the grid image is pillow distortion.

In this embodiment, the preset distortion coefficient is adjusted according to the distortion type of the grid image. When there is barrel distortion in the grid image after passing through the optical component, it indicates that an anti-distortion degree of the anti-distortion grid image obtained through the preset distortion coefficient is too large, and then it is needed to reduce the preset distortion coefficient. On the contrary, when there is pillow distortion in the grid image after passing through the optical component, it indicates that an anti-distortion degree of the anti-distortion grid image obtained through the preset distortion coefficient is too small, and then it is needed to increase the preset distortion coefficient. By adjusting the preset distortion coefficient, the distortion of the grid image can be reduced, i.e., there is no distortion or very little distortion in the grid image obtained from the anti-distortion grid image which is subject to distortion treatment with adjusted distortion coefficient. In this way, the resulting distortion coefficient is the appropriate distortion coefficient corresponding to the to-be-measured optical component.

For the adjustment of the distortion coefficient, an adjustment value may be set each time and then the distortion coefficient may meet requirements after one-time adjustment, or after the above steps S10-S40 are performed for multiple times, the distortion coefficient may meet the requirements after multiple adjustments.

In the above embodiment, the adjustment of the preset distortion coefficient can utilize the slope of the grid line as the basis for judging the distortion type of the grid image, which can solve the problem that distortion coefficients of various positions of an optical component need to be repeatedly measured when measuring the optical component in the virtual reality device, and which can reduce the processing difficulty in obtaining distortion data for each location. Further, the effect of the distortion coefficient can be directly verified by the obtained grid image that passes through the optical component.

In some examples, one manner of obtaining the grid image after passing through the to-be-measured optical component may include: obtaining an acquired grid image of the anti-distortion grid image via an image acquisition device at a preset viewpoint after the anti-distortion grid image passes through the to-be-measured optical component.

The anti-distortion grid image is a grid image which passes though the to-be-measured optical component, and which may be received and acquired through the image acquisition device (such as a camera, a video camera or pick-up head). The image acquisition device may be placed at the preset viewpoint, i.e., the position of the user's eyes when the user observes images through the virtual reality device. This can simulate images that the user observes through the virtual reality device, and then according to distortion of the grid image, it can be determined whether the acquired distortion coefficient for the optical component applied in the virtual reality device is appropriate.

When using the image acquisition device to capture images, since the image acquisition device is also provided with optical components such as a lens, in order to avoid distortion of the acquired image caused by the optical component of the image acquisition device itself, a distortion parameter of the image acquisition device may be further obtained before the acquisition of the acquired grid image passing through the to-be-measured optical component by the image acquisition device. In this way, the distortion of the captured image caused by the optical component of the image acquisition device itself can be removed, and the distortion type of the grid image passing through the to-be-measured optical component can be more accurately obtained, thereby finally obtaining a more accurate distortion coefficient.

One way for obtaining the distortion parameter of the image acquisition device may use a calibration method to calibrate the image acquisition device. The calibration method may use Zhang Zhengyou calibration method and may specifically include the following process.

A step S1 is to print a template and paste the template on a flat surface. The template may be a grid image.

A step S2 is to use the image acquisition device to acquire several template images from different angles.

A step S3 is to detect calibration points in the image.

A step S4 is to calculate an internal parameter and an external parameter of the image acquisition device.

A step S5 is to solve a radial distortion coefficient by the least-square method.

A step S6 is to optimize all internal and external parameters by calculating the minimum parameter value.

A step S7 is to take the optimized internal and external parameters as distortion parameters of the image acquisition device for correct images.

In an optical embodiment, before the acquisition of the acquired grid image passing through the to-be-measured optical component by the image acquisition device, the method may further include a step S13 of adjusting the image acquisition device, thereby enabling an imaging plane of the image acquisition device to be parallel with a plane where the preset grid image is located.

In order to avoid distortion of the grid image passing through the to-be-measured optical component and acquired via the image acquisition device due to shooting angles, the imaging plane (which is, for example, a plane in which a lens of the image acquisition device is located) of the image acquisition device is further adjusted to enable the imaging plane to be parallel with the plane where the preset grid image is located.

One way for adjusting the image acquisition device specifically includes the following steps.

A step S131 is to display an image including more than two line-segments on a display screen.

A step S132 is to use the image acquisition device to acquire an image of the two line-segments displayed on the display screen, and calculate a length of each of the line-segments in the image.

A step S133 is to compare the lengths of the line-segments.

A step S134 is to, rotate the image acquisition device clockwise when the length of a left line segment is smaller than the length of a right line segment in the same direction as the left line segment, and rotate the image acquisition device counterclockwise when the length of the left line segment is greater than the length of the right line segment in the same direction as the left line segment.

In this embodiment, more than two straight lines are first displayed on the display screen, and then an image of the above straight lines are acquired by the image acquisition device and the lengths of the line-segments. When the length of the left line segment is smaller than the length of the right line segment in the same direction as the left line segment, it indicates that a right side in this direction of the imaging plane (i.e., lens) of the image acquisition device is lower than a left side in this direction of the imaging plane (i.e., lens) of the image acquisition device. Thai is, the image acquisition device is tilted to the right in this direction, and then the image acquisition device is rotated clockwise. Otherwise, when the length of the left line segment is greater than the length of the right line segment in the same direction as the left line segment, it indicates that the right side in this direction of the imaging plane of the image acquisition device is higher than the left side in this direction of the imaging plane of the image acquisition device. Thai is, the image acquisition device is tilted to the left in this direction, and then the image acquisition device is rotated counterclockwise. In the above adjustment, a rotation angle may be set according to a difference between the length of the left line segment and the length of the right line segment. One-time adjustment may enable the imaging plane of the image acquisition device to be parallel with the plane where the preset grid image is located. Or, after performing the above steps S132-S134 for multiple times, multiple adjustments may enable the imaging plane of the image acquisition device to be parallel with the plane where the preset grid image is located.

Figure 8:
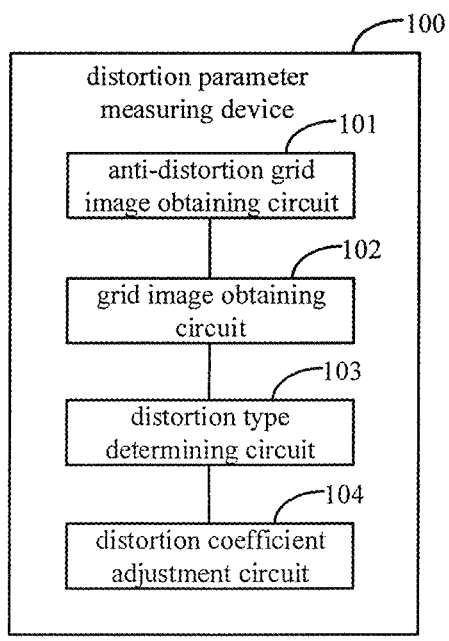
FIG. 8 is a block diagram of a measuring device for a visual reality device according to some embodiments of the present disclosure.

One embodiment of the present disclosure further provides a distortion parameter measuring device for a visual reality device. As shown in FIG. 8, the measuring device 100 includes: an anti-distortion grid image obtaining circuit 101 configured to obtain an anti-distortion grid image according to a preset distortion coefficient; a grid image obtaining circuit 102 configured to obtain a grid image of the anti-distortion grid image at a preset viewpoint after the anti-distortion grid image passes through a to-be-measured optical component; a distortion type determining circuit 103 configured to obtain a distortion type of the grid image after passing through the to-be-measured optical component; and a distortion coefficient adjustment circuit 104 configured to adjust the preset distortion coefficient according to the distortion type of the grid image, thereby reducing distortion of the grid image.

The units in the above measuring device may be integrated or deployed separately. The above units may be merged into one unit or further divided into multiple sub-units.

Through the description of the above embodiments, the measuring device of one embodiment of the present disclosure may be realized by means of software, or by means of software plus the necessary general hardware, or, of course, by means of hardware. Based on such understanding, the technical solutions of the present disclosure, in essence, or the parts contributing to related art, may be embodied in the form of software products. By taking software implementation as an example, as a logical device, it is formed by using a processor of a physical measuring device to read corresponding computer program instructions from a non-volatile memory into a memory.

One embodiment of the present disclosure further provides a distortion parameter measuring system for a visual reality device, which includes: a measuring bracket; a visual reality device disposed on the measuring bracket and including a to-be-measured optical component; an image acquisition device disposed on the measuring bracket and located at a light emitting side of the optical component; and a controller coupled with the visual reality device and the image acquisition device, respectively. The controller includes the measuring device of the above embodiments.

In the measuring system of one embodiment of the present disclosure, a grid image of the anti-distortion grid image may be acquired via the image acquisition device after the anti-distortion grid image passes through the to-be-measured optical component. The grid image acquired by the image acquisition device simulates an image observed through the virtual reality device. Then, by implementing the above measuring method with the measuring device in the controller, an appropriate distortion coefficient corresponding to the to-be-measured optical component can be obtained. The to-be-measured optical component may be applied to the virtual reality device. When the above distortion coefficient is used as the distortion coefficient of the optical component in the virtual reality device for performing anti-distortion processing on images, there is no distortion or very little distortion in the image observed through the virtual reality device, thereby improving image display effect of the virtual reality device and improving user experience.

In an optional embodiment, the measuring bracket includes a horizontal rod and a vertical rod. The virtual reality device is disposed on the horizontal rod. The image acquisition device is disposed on the vertical rod, and is at a light emitting side of the optical component.

In some examples, the measuring system further includes two fixing plates. The two fixing plates are fixed to the measuring bracket, respectively. The two fixing plates clamp the virtual reality device.

The presence of the fixing plates can limit the position of the virtual reality device, thereby avoiding positional movement of the virtual reality device during measurement and then improving measurement accuracy.

Figure 9:
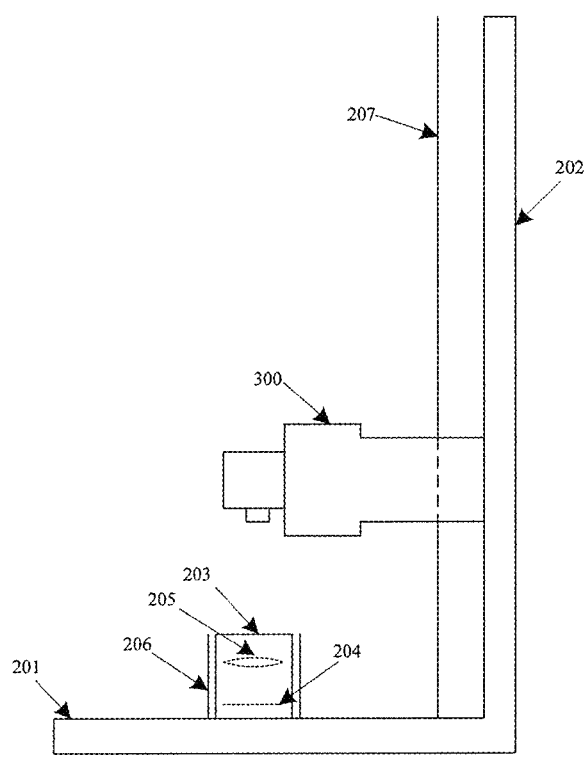
FIG. 9 is a schematic view of a measuring system for a visual reality device according to some embodiments of the present disclosure.

FIG. 9 is a schematic view of a distortion parameter measuring system for a visual reality device according to some embodiments of the present disclosure. The working process of the measuring system will be described hereinafter with reference to the structure of the measuring system shown in FIG. 9.

The measuring system includes a horizontal rod 201 and a vertical rod 202. A virtual reality device 203 may be directly disposed on the horizontal rod 201. The virtual reality device 203 includes a display screen 204 and an optical component 205. The optical component 205 may be taken as the toObe-measured optical component, and then there is no need to provide an external display screen separately.

The image acquisition device is a pan-tilt camera 300 which is disposed on the vertical rod 202. The measuring system further includes two fixing plates 206. The virtual reality device 203 is disposed between the two fixing plates 206.

The measuring system further includes a sliding rail 207 with scales. The controller controls the pan-tilt camera 300 to move along the sliding rail 207, thereby enabling the pan-tilt camera 300 to be at the preset viewpoint.

The sliding rail 207 is provided with scale values, which are convenient for surveyors to intuitively know the position of the pan-tilt camera 300 through the scale values on the sliding rail 207.

The pan-tilt camera 300 may include a distance detector or may be provided with another distance detector. The distance detector, for example, may be an infrared ranging sensor. The distance detector may detect a distance between a lens of the pan-tilt camera 300 and the virtual reality device 203, and then send the detected distance to the controller. Then, the controller can control the pan-tilt camera 300 to move along the sliding rail 207 according to a preset distance between the lens of the pan-tilt camera 300 and the virtual reality device 203, thereby enabling the pan-tilt camera 300 to be at the preset viewpoint.

Figure 10:
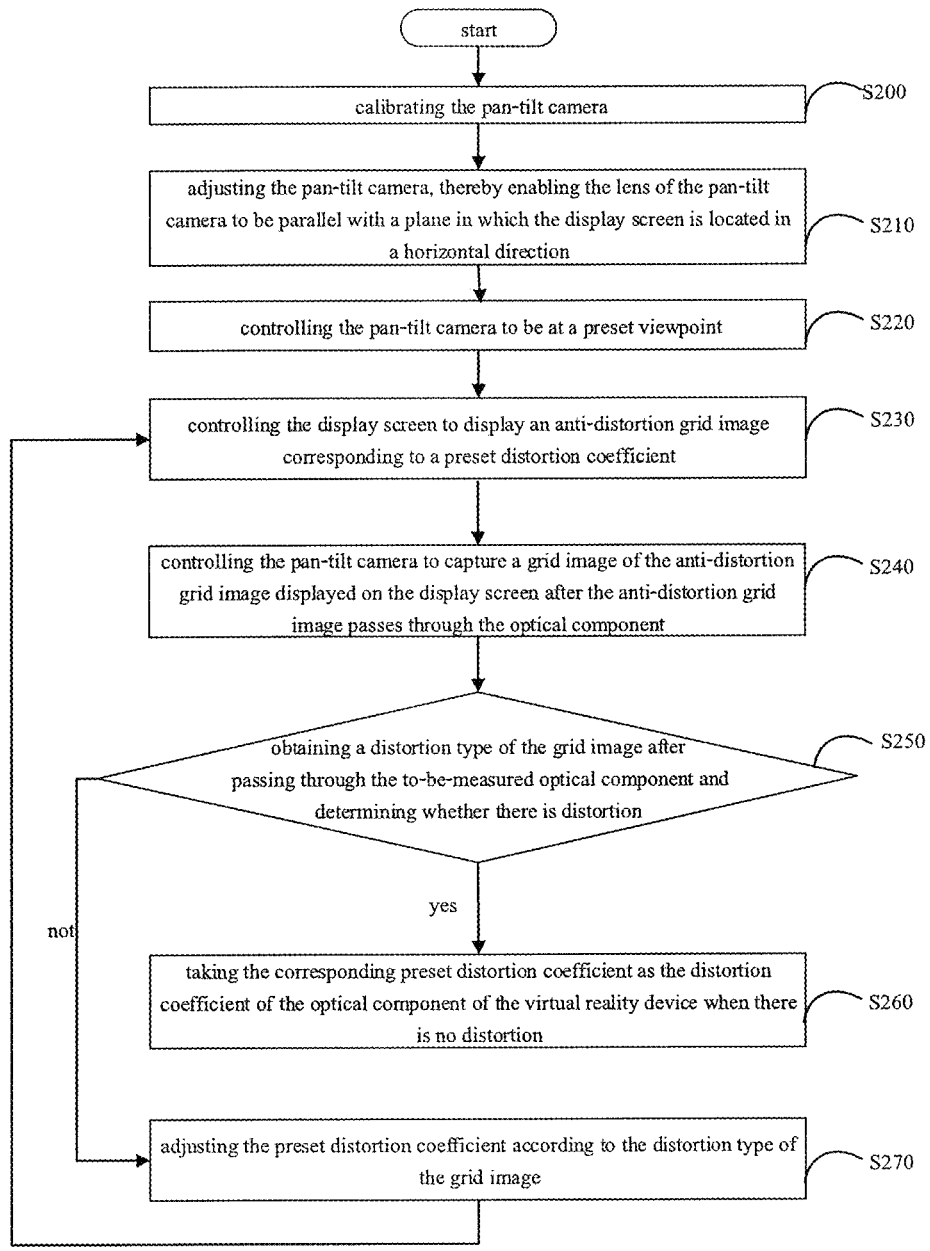
FIG. 10 is a flowchart showing operation of a measurement system for a visual reality device according to some embodiments of the present disclosure.

As shown in FIG. 10, after the measuring system starts measuring, the working process is specifically as follows.

A step S200 is to calibrate the pan-tilt camera 300, thereby obtaining a distortion parameter of the pan-tilt camera 300.

A step S210 is to adjust the pan-tilt camera 300, thereby enabling the lens of the pan-tilt camera to be parallel with a plane in which the display screen is located in a horizontal direction.

After completion of the calibration, the pan-tilt camera is adjusted so that the lens of the pan-tilt camera is parallel with a plane in which the display screen is located in the horizontal direction. Specifically, the controller controls the display screen to display an image including two straight lines. For example, an image of a straight line can be displayed on each of the left and right sides of the display screen. The optical component of the virtual reality device is removed away, and the controller obtains a captured image of the two straight lines displayed on the display screen via by the pan-tilt camera. The controller calculates and compares lengths of the two straight lines in the image. When the length of the left straight line is smaller than the length of the right straight line, the pan-tilt camera is controlled to rotate clockwise by a certain angle. When the length of the left straight line is greater than the length of the right straight line, the pan-tilt camera is controlled to rotate counterclockwise by a certain angle. Then the above process of calculation and comparison can be repeated until the length of the left straight line equals to the length of the right straight line. At this point, the lens of the pan-tilt camera is parallel to the plane where the display screen is located along the horizontal direction.

A step S220 is to control the pan-tilt camera to be at a preset viewpoint.

For example, an infrared ranging sensor of the pan-tilt camera may be used to detect a distance between the pan-tilt camera and the virtual reality device, and then send the detected distance to the controller. Then, the controller can control the pan-tilt camera to move along the sliding rail according to a preset distance between the pan-tilt camera and the virtual reality device, thereby enabling the pan-tilt camera to be at the preset viewpoint.

A step S230 is to control the display screen to display an anti-distortion grid image corresponding to a preset distortion coefficient.

The controller obtains a central position of a center of the optical component in the display screen according to the position relationship between the optical component and the display screen. Then, the controller uses a distortion model with the preset distortion coefficient to calculate a corresponding position of each of grid points which take the central position as a center, after the anti-distortion in the display screen, thereby obtaining the anti-distortion grid image for the display screen. The anti-distortion grid image is displayed on the display screen.

A step S240 is to control the pan-tilt camera to capture a grid image of the anti-distortion grid image displayed on the display screen after the anti-distortion grid image passes through the optical component.

A step S250 is to obtain a distortion type of the grid image after passing through the to-be-measured optical component and determine whether there is distortion.

A step S260 is to take the corresponding preset distortion coefficient as the distortion coefficient of the optical component of the virtual reality device when there is no distortion.

A step S270 is to adjust the preset distortion coefficient according to the distortion type of the grid image, and return to perform the above step S230.

In the measuring system of the above embodiment, by detecting images passing through the optical component and anti-distortion principle, automatic measurement of the distortion coefficient is realized, and then an appropriate distortion coefficient corresponding to the to-be-measured optical component can be obtained. The to-be-measured optical component may be applied to the virtual reality device. When the above distortion coefficient is used as the distortion coefficient of the optical component in the virtual reality device for performing anti-distortion processing on images, there is no distortion or very little distortion in the image observed through the virtual reality device, thereby improving image display effect of the virtual reality device and improving user experience.

After considering the specification and practicing the disclosure disclosed herein, it will be easy for those skilled in the art to think of other implementations of the present disclosure. The present disclosure is intended to cover any variants, uses or adaptations of the present disclosure that follow the general principles of the present disclosure and include common sense or common technical means in the technical field not disclosed in the present disclosure. The specification and embodiments are considered to be illustrative only, and the true scope and spirit of the present disclosure are indicated by the following claims.

It can be appreciated that the present disclosure is not limited to the precise structures described above and shown in the accompanying drawings, and various modifications and changes can be made without departing from their scope. The scope of the present disclosure is limited only by the appended claims.

What is claimed is:

1. A method for measuring a distortion parameter of a visual reality device comprising:
   obtaining an anti-distortion grid image according to a first distortion coefficient;
   obtaining a grid image of the anti-distortion grid image at a preset viewpoint after the anti-distortion grid image passes through a to-be-measured optical component of the visual reality device;
   determining a distortion type of the grid image after passing through the to-be-measured optical component;
   adjusting the first distortion coefficient according to the distortion type of the grid image, thereby obtaining an adjusted first distortion coefficient and then reducing distortion of the grid image;
   repeating the above steps until the distortion of the grid image is less than or equal to a distortion threshold;
   wherein the adjusted first distortion coefficient when the distortion of the grid image is less than or equal to the distortion threshold, is taken as a distortion coefficient of the to-be-measured optical component.

2. The method of claim 1, wherein the obtaining an anti-distortion grid image according to a first distortion coefficient includes:
   obtaining a central position of a center of the to-be-measured optical component in a first grid image;
   using a distortion model with the first distortion coefficient to calculate a corresponding position of each grid point after the anti-distortion in the first grid image which takes the central position as a center, thereby obtaining the anti-distortion grid image.

3. The method of claim 1, wherein the obtaining a grid image of the anti-distortion grid image at a preset viewpoint after the anti-distortion grid image passes through a to-be-measured optical component of the visual reality device includes:

obtaining an acquired grid image of the anti-distortion grid image via an image acquisition device at the preset viewpoint after the anti-distortion grid image passes through the to-be-measured optical component.

4. The method of claim 3, wherein before obtaining an acquired grid image of the anti-distortion grid image via an image acquisition device at the preset viewpoint after the anti-distortion grid image passes through the to-be-measured optical component, the method further includes: obtaining a distortion coefficient of the image acquisition device.

5. The method of claim 3, wherein before obtaining an acquired grid image of the anti-distortion grid image via an image acquisition device at the preset viewpoint after the anti-distortion grid image passes through the to-be-measured optical component, the method further includes: adjusting the image acquisition device, thereby enabling an imaging plane of the image acquisition device to be parallel with a plane where the preset grid image is located.

6. The method of claim 1, wherein the determining a distortion type of the grid image after passing through the to-be-measured optical component includes:

obtaining via an image processing algorithm a bending direction of grid lines in the grid image after passing through the to-be-measured optical component relative to the center of the grid image after passing through the to-be-measured optical component;

determining the distortion type of the grid image according to the bending direction.

7. The method of claim 6, wherein the determining the distortion type of the grid image according to the bending direction includes:

determining the distortion type of the grid image to be pillow distortion when the grid lines in the grid image bend in a direction towards the center of the grid image;

determining the distortion type of the grid image to be barrel distortion when the grid lines in the grid image bend in the direction far from the center of the grid image.

8. The method of claim 7, wherein the adjusting the first distortion coefficient according to the distortion type of the grid image includes: reducing the first distortion coefficient when the distortion type of the grid image is barrel distortion, and increasing the preset distortion coefficient when the distortion type of the grid image is pillow distortion.

9. The method of claim 6, wherein the obtaining via an image processing algorithm a bending direction of grid lines in the grid image after passing through the to-be-measured optical component relative to the center of the grid image after passing through the to-be-measured optical component, includes:

using the image processing algorithm to obtain a slope of a line segment defined by a point at an edge position and a point adjacent the center of the grid image among grid lines in the grid image after passing through the to-be-measured optical component, and determining the bending direction according to the slope.

10. A distortion parameter measuring device for a visual reality device comprising:

an anti-distortion grid image obtaining circuit configured to obtain an anti-distortion grid image according to a first distortion coefficient;

a grid image obtaining circuit configured to obtain a grid image of the anti-distortion grid image at a preset viewpoint after the anti-distortion grid image passes through a to-be-measured optical component;

a distortion type determining circuit configured to determine a distortion type of the grid image after passing through the to-be-measured optical component; and a distortion coefficient adjustment circuit configured to adjust the first distortion coefficient according to the distortion type of the grid image, thereby reducing distortion of the grid image;

wherein the adjusted first distortion coefficient when the distortion of the grid image is less than or equal to a distortion threshold, is taken as a distortion coefficient of the to-be-measured optical component.

11. A distortion parameter measuring system for a visual reality device comprising:

a measuring bracket;

a visual reality device disposed on the measuring bracket and including a to-be-measured optical component;

an image acquisition device disposed on the measuring bracket and located at a light emitting side of the optical component; and a controller coupled with the visual reality device and the image acquisition device, respectively;

wherein the controller includes the measuring device of claim 10.

12. The distortion parameter measuring system of claim 11, wherein the measuring bracket includes a horizontal rod and a vertical rod; the virtual reality device is disposed on the horizontal rod; the image acquisition device is disposed on the vertical rod, and is at the light emitting side of the optical component.

13. The distortion parameter measuring system of claim 11, wherein the measuring system further includes two fixing plates; the two fixing plates are fixed to the measuring bracket, respectively; and the two fixing plates clamp the virtual reality device.

14. The distortion parameter measuring system of claim 11, wherein the measuring system further includes a sliding rail with scales; the controller controls the image acquisition device to move along the sliding rail, thereby enabling the image acquisition device to be at the preset viewpoint.

15. The distortion parameter measuring system of claim 14, wherein the measuring system further includes a distance detector configured to may detect a distance between the image acquisition device and the virtual reality device, and then send the detected distance to the controller, so that the controller controls the image acquisition device to move along the sliding rail, thereby enabling the image acquisition device to be at the preset viewpoint.

* * * * *